April 25, 1961   B. P. WASHBURNE   2,981,944
MICROWAVE NAVIGATION SYSTEM
Original Filed April 10, 1956   4 Sheets-Sheet 1
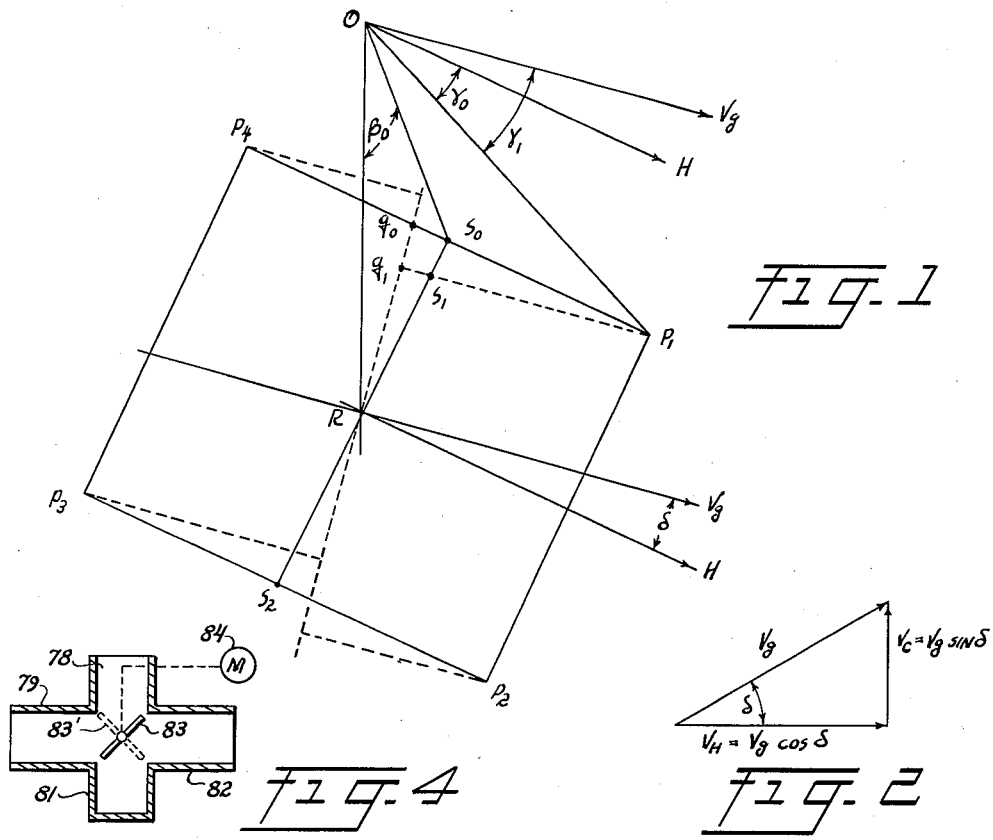
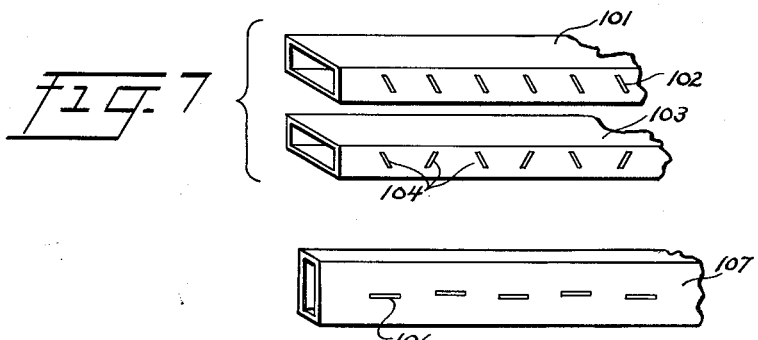
INVENTOR.
BRENTON P. WASHBURNE
BY
ATTORNEY

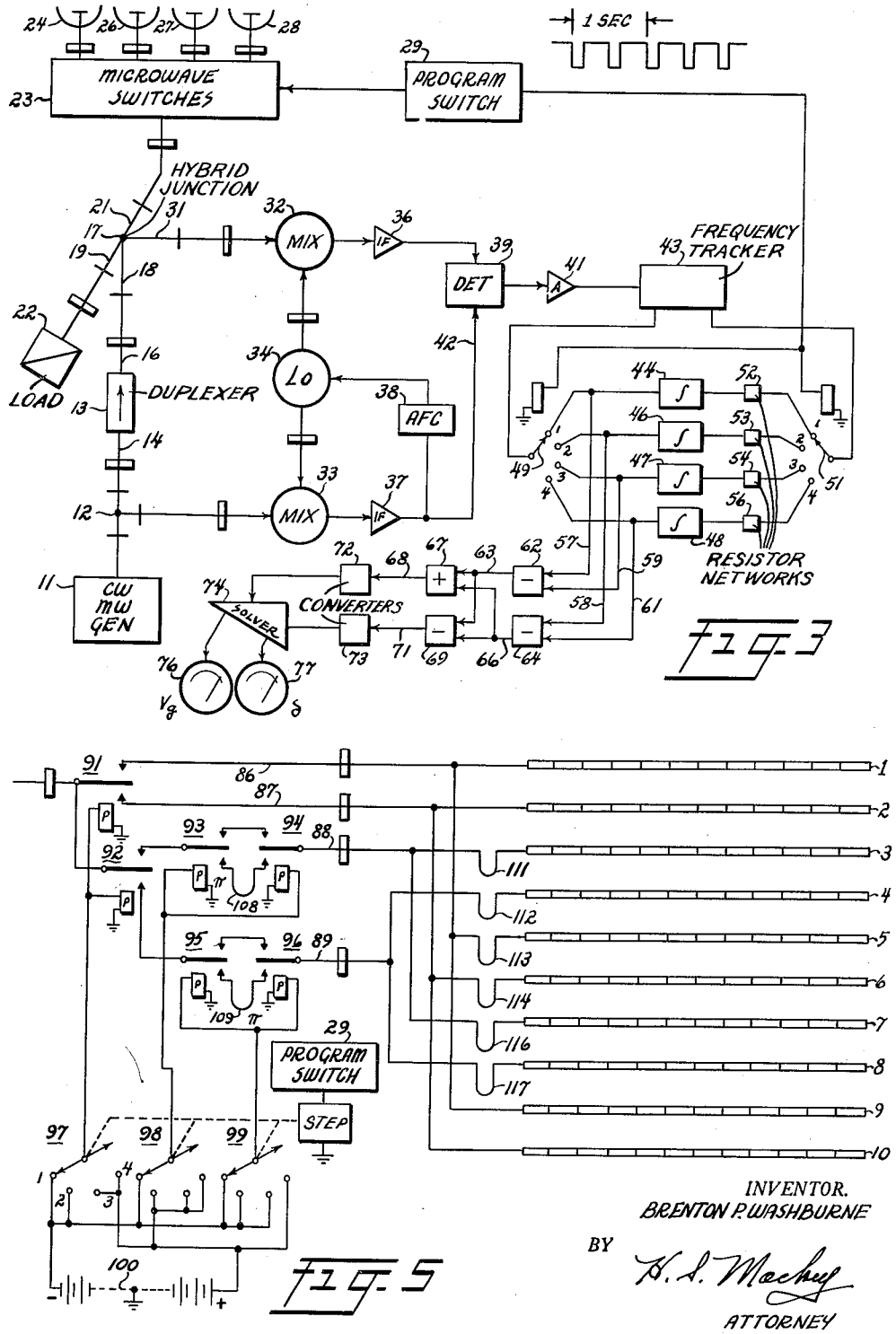

April 25, 1961   B. P. WASHBURNE   2,981,944
MICROWAVE NAVIGATION SYSTEM
Original Filed April 10, 1956   4 Sheets-Sheet 3

| | 0 | π/2 | π | 3π/2 | 2π | | ARRAY NO | TYPE of ARRAY |
|---|---|---|---|---|---|---|---|---|
| | 0 | π/2+π | π | 3π/2+π | 2π | | 1 | IN-PHASE |
| | π/2 | π | 3π/2 | 2π | 5π/2 | | 2 | ANTIPHASE |
| | π/2 | π+π | 3π/2 | 2π+π | 5π/2 | | 3 | IN-PHASE |
| | π | 3π/2 | 2π | 5π/2 | 3π | | 4 | ANTIPHASE |
| | π | 3π/2+π | 2π | 5π/2+π | 3π | | 5 | IN-PHASE |
| | 3π/2 | 2π | 5π/2 | 3π | 7π/2 | | 6 | ANTIPHASE |
| | 3π/2 | 2π+π | 5π/2 | 3π+π | 7π/2 | | 7 | IN-PHASE |
| | 2π | 5π/2 | 3π | 7π/2 | 4π | | 8 | ANTIPHASE |
| | 2π | 5π/2+π | 3π | 7π/2+π | 4π | | 9 | IN-PHASE |
| | | | | | | | 10 | ANTIPHASE |

Fig. 9

| BEAM NUMBER & STEP SWITCH CONTACT NO. | MICROWAVE SWITCH POSITION | LINEAR ARRAYS ENERGIZED | ARRAY PHASE |
|---|---|---|---|
| 1 | 91 UP | 1, 5, 9 | NORMAL |
| | 92 UP 93/94 UP | 3, 7 | NORMAL |
| 2 | 91 UP | 1, 5, 9 | NORMAL |
| | 92 UP 93/94 DOWN | 3, 7 | REVERSED |
| 3 | 91 DOWN | 2, 6, 10 | NORMAL |
| | 92 DOWN 95/96 UP | 4, 8 | NORMAL |
| 4 | 91 DOWN | 2, 6, 10 | NORMAL |
| | 92 DOWN 95/96 DOWN | 4, 8 | REVERSED |

Fig. 6

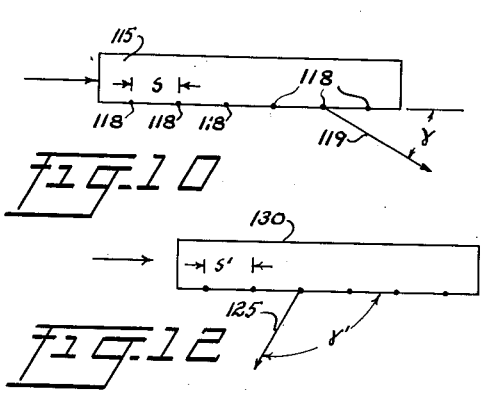

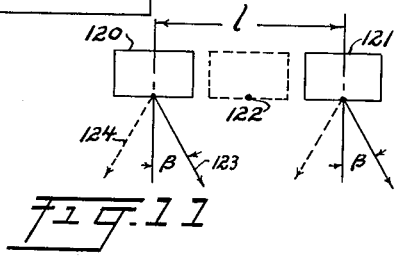

Fig. 11

INVENTOR.
BRENTON P. WASHBURNE
BY H. L. Mackey
ATTORNEY

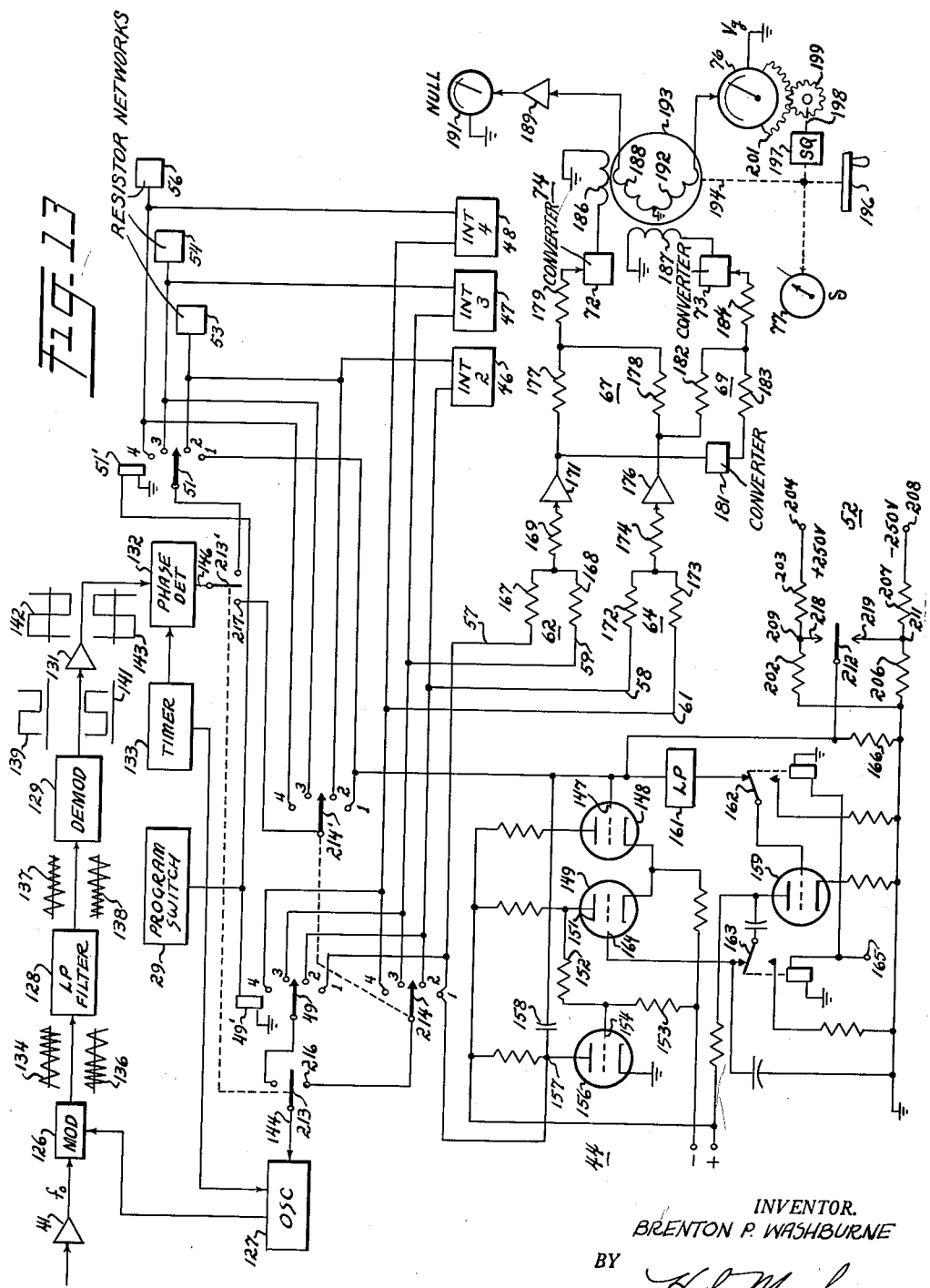

United States Patent Office

2,981,944
Patented Apr. 25, 1961

2,981,944

MICROWAVE NAVIGATION SYSTEM

Brenton P. Washburne, Penn Valley, Pa., assignor to General Precision, Inc., a corporation of Delaware Continuation of application Ser. No. 577,382, Apr. 10, 1956. This application Dec. 6, 1960, Ser. No. 74,086

7 Claims. (Cl. 343—9)

This invention relates to microwave aircraft navigation systems employing echo signals embodying Doppler frequency differences to secure indications of ground speed and drift angle.

This application is a continuation of my United States application for "Microwave Navigation System," Serial No. 577,382, filed April 10, 1956, now abandoned.

The instrument provided by this invention is highly simplified to secure weight reduction. The microwave antenna is fixed relative to the aircraft and is not stabilized to the horizontal plane during pitch and roll movements of the craft. The antenna transmits four microwave pencil beams obliquely toward the earth at selected angles, and their return signals echoed from the earth are instrumented to secure ground speed and drift angle indications.

Instruments of this type employing a non-stabilized antenna are generally provided with pitch and roll sensing devices and a computer for correcting output indications. However, in the interest of weight reduction these components have in this instrument been entirely omitted, and the arrangement of the beams and the signal instrumentation have been devised to minimize pitch and roll errors. The computing components for securing ground speed and drift indications from the beam return signals are exceedingly simple, but provide accurate and convenient indications of these two quantities essential for dead reckoning navigation of an aircraft. Vertical velocity can also be secured from the beam signals.

The instrument employs a continuous wave transmitter and appropriate duplexer arranged to minimize frequency modulation of the transmitter. A planar antenna is employed and is composed of a number of linear arrays fed through several microwave switches so as to project four beams in sequence. The received signals are individually demodulated, and then applied to a conventional microwave heterodyne receiver to secure four signals in sequence representing the four Doppler difference frequencies between the beam echo signal frequencies and the transmitter frequency. These four representative signals are applied to a simplified frequency tracker containing four integrators which are switched in concert with the beam switching. The direct current integrator outputs are continuously presented to sum and difference circuits, where they are converted to two signals which are functions of the cosine and the sine of the drift angle. These signals are then converted into two other signals representing ground speed and drift angle, which are displayed on indicating instruments.

The principal purpose of this invention is to provide a microwave aircraft navigation system having reasonable accuracy and minimum weight.

Another purpose of this invention is to provide an aircraft dead reckoning navigation system of maximum simplicity.

Another purpose of this invention is to provide a microwave navigational system, including a fixed antenna, for indicating ground speed and drift angle, with substantial inherent freedom from pitch and roll errors and from errors due to drift angle and vertical velocity, but without the employment of correctional computing components.

Further understanding of this invention may be secured from the detailed description and drawings, in which:

Figure 1 is a diagram illustrating the geometry of the four microwave beams.

Figure 2 indicates the solution of a right triangle as employed in the invention.

Figure 3 is a functional diagram of the apparatus of the invention.

Figure 4 is a schematic diagram of a microwave switch which may be employed in the invention.

Figure 5 is a schematic diagram of the planar antenna array and the microwave switches of the invention.

Figure 6 is a tabulation of microwave switch positions controlling beam generation.

Figures 7 and 8 are oblique sketches of microwave linear arrays.

Figure 9 is a diagram showing the relative instantaneous radiation phases of the elements of a planar antenna array for use with the invention.

Figures 10 and 12 depict beam formations of linear in-phase and antiphase arrays.

Figure 11 depicts the formation of two beams when two single-beam arrays are placed parallel to each other.

Figure 13 is a schematic diagram of a frequency tracker, integrating amplifier, adding circuits, triangle solver, and indicators for use in the instrumentation of the invention.

Referring now to Fig. 1, the point O designates the position of an airplane and the letters P, $P_1$, $P_2$, $P_3$ and $P_4$ define the ground plane. The line OR is vertical and the airplane is assumed heading in the horizontal direction shown by the arrow H. Its ground track direction is designated by the symbol $V_g$, which also represents speed in the ground track direction. The drift angle $\delta$ is the angle between H and $V_g$. An aircraft microwave transmitter emits four similar pencil beams which are approximately equal in their cross sectional dimensions in the H direction and transverse thereto. These beams are emitted from an antenna which is fixed relative to the airplane, and strike the earth at points $P_1$, $P_2$, $P_3$ and $P_4$. These points are symmetrically disposed about the heading axis RH, and also are symmetrical about the transverse axis $S_0RS_2$. The "looking" angle is defined as the angle between the velocity vector direction and a beam direction and, in the case of beam 1, striking the earth at $P_1$, this angle is designated as $\gamma_1$. The angle between the heading direction H and the direction $OP_1$ of beam No. 1 is designated as $\gamma_0$. The looking angles of all of the beams, disregarding sign will equal $\gamma_0$ when the drift angle is zero because of the beam symmetries as described. In the presence of drift, it is evident that $\gamma_1 \neq \gamma_2$, $\gamma_1 = \gamma_3$ and $\gamma_2 = \gamma_4$, in which $\gamma_2$, $\gamma_3$ and $\gamma_4$ are the looking angles of beams 2, 3 and 4.

When a beam having a microwave frequency $f$ is transmitted in the direction of $OP_1$, the returned frequency $f_1$ is higher than $f$ and the difference is termed the Doppler difference frequency $\nu_1$. The relation is $$\nu_1 = \frac{2V_g}{\lambda} \cos \gamma_1 \qquad (1)$$

in which $V_g$ is the true aircraft speed in the direction and the ground track which differs from the direction of the antenna axis by the drift angle, $\delta$. $\lambda$ is the microwave length in free space. The Doppler difference frequencies derived from the returns from points $P_2$, $P_3$ and $P_4$ are termed $\nu_2$, $\nu_3$ and $\nu_4$.

Equation 1 is expressed in terms of $\gamma_0$, $\beta_0$, and $\delta$, in which $\beta_0$ is the angle $ROS_0$ as follows. In Fig. 1, $$\cos \gamma_1 = \frac{q_1 P_1}{OP_1} \quad (2)$$

$$\frac{q_1 P_1}{q_0 P_1} = \cos \delta \quad (3)$$

$$q_0 P_1 = q_0 S_0 + S_0 P_1 \quad (4)$$

$$q_0 S_0 = RS_0 \tan \delta \quad (5)$$

$$RS_0 = OS_0 \sin \beta_0 \quad (6)$$

$$\frac{OS_0}{OP_1} = \sin \gamma_0 \quad (7)$$

$$\frac{S_0 P_1}{OP_1} = \cos \gamma_0 \quad (8)$$

Therefore $$\cos \gamma_1 = \cos \delta \frac{q_0 P_1}{OP_1} \quad (9)$$

$$= \cos \delta \left( \frac{q_0 S_0}{OP_1} + \frac{S_0 P_1}{OP_1} \right) \quad (10)$$

$$= \cos \delta \left( \frac{RS_0 \tan \delta}{OP_1} + \frac{S_0 P_1}{OP_1} \right) \quad (11)$$

$$= \cos \delta \left( \frac{OS_0 \sin \beta_0 \tan \delta}{OP_1} + \frac{S_0 P_1}{OP_1} \right) \quad (12)$$

$$= \cos \delta (\sin \gamma_0 \sin \beta_0 \tan \delta + \cos \gamma_0) \quad (13)$$

$$= \sin \gamma_0 \sin \beta_0 \sin \delta + \cos \delta \cos \gamma_0 \quad (14)$$

Substituting this expression for $\cos \gamma_1$ in Equation 1, $$\nu_1 = \frac{2V_g}{\lambda}(\cos \delta \cos \gamma_0 + \sin \delta \sin \beta_0 \sin \gamma_0) \quad (15)$$

It may also be shown that the value of $\nu_2$ is $$\nu_2 = \frac{2V_g}{\lambda}(\cos \delta \cos \gamma_0 - \sin \delta \sin \beta_0 \sin \gamma_0) \quad (16)$$

The values for $\nu_3$ and $\nu_4$ are the negatives of these since $\cos \gamma_3 = -\cos \gamma_1$ and $\cos \gamma_4 = -\cos \gamma_2$, from which it follows that $$\nu_3 = -\nu_1 \text{ and } \nu_4 = -\nu_2 \quad (17)$$

in the absence of vertical velocity.
Let $$K_1 = \frac{2V_g}{\lambda} \cos \gamma_0 \quad (18)$$

and $$K_2 = \frac{2V_g}{\lambda} \sin \beta_0 \sin \gamma_0 \quad (19)$$

Then the complete set of relations between the Doppler difference frequencies and the drift angle is:

$$\nu_1 = K_1 \cos \delta + K_2 \sin \delta \quad (20)$$

$$\nu_2 = K_1 \cos \delta - K_2 \sin \delta \quad (21)$$

$$\nu_3 = K_1 \cos \delta - K_2 \sin \delta \quad (22)$$

$$\nu_4 = K_1 \cos \delta + K_2 \sin \delta \quad (23)$$

The values of $\nu_1$ and $\nu_2$ are positive, while those for $\nu_3$ and $\nu_4$ are negative, which means physically that at all expected drift angles the returns of beams 1 and 2 are higher than the transmitter frequency, while returns from beams 3 and 4 are lower than the transmitter frequency.

If $\nu_1$ and $\nu_2$ be considered as having magnitudes equal to components of velocities in the $RP_1$ and $RP_2$ directions, their resolution will provide the values of $V_g$ and $\delta$. However, it is desirable instead of $\nu_1$ to employ, after demodulation, the average or algebraic sum of $\nu_1$ and $\nu_3$, and instead of $\nu_2$ to employ the average or sum of $\nu_2$ and $\nu_4$. This is desirable because it affords the benefits of "Janus" microwave radar operation, in which conventionally two beam echoes from selected forms of antennas, one beam fore and one aft, are beat together to derive therefrom a Doppler difference signal equal to the arithmetical sum of the individual Doppler differences. These benefits include relative freedom from pitch and vertical errors, and when appropriate antennas are employed include freedom from error due to changes in microwave transmitter frequency.

Performing the summing operations required to secure these Janus benefits:

$$\nu_1 - \nu_3 = 2K_1 \cos \delta + 2K_2 \sin \delta \quad (24)$$

$$\nu_2 - \nu_4 = 2K_1 \cos \delta - 2K_2 \sin \delta \quad (25)$$

Considering these as vectors, the sum is proportional to the velocity in the heading direction:

$$(\nu_1 - \nu_3) - (\nu_2 - \nu_4) = 4K_1 \cos \delta = K_3 V_H \quad (26)$$

and the difference is proportional to the lateral velocity:

$$(\nu_1 - \nu_3) - (\nu_2 - \nu_4) = 4K_2 \sin \delta = K_4 V_C \quad (27)$$

where $$K_3 = \frac{8}{\lambda} \cos \gamma_0 \quad (28)$$

and $$K_4 = \frac{8}{\lambda} \sin \beta_0 \sin \gamma_0 \quad (29)$$

It follows that $$V_H = V_g \cos \delta \quad (30)$$

and $$V_C = V_g \sin \delta \quad (31)$$

It is obvious that when the quantities $V_H$ and $V_C$ are considered as the two sides of a right triangle, Fig. 2, the hypotenuse is $V_g$, while the angle is $\delta$. Solution of the triangle therefore, by any form of right triangle solver, employing $V_H$ and $V_C$ as input data, results in values for $V_g$ and $\delta$. These quantities are what are desired, and are the output indications of the instrument.

The invention employs the circuit of Fig. 3, in which 11 is a continuos wave microwave generator. Its energy is transmitted through tee 12 to one-way device 13, which may, for example, be a ferrite rotator as described in U.S. Patent No. 2,644,930, of Charles H. Luhrs, entitled Microwave Polarization Rotating Device and Coupling Network. Briefly, the energy from input rectangular waveguide 14 is rotated 45° in a selected direction during passage through rotator 13 and passes out to an output waveguide 16. Energy attempting to pass in the opposite direction is rotated 45° in the same selected direction so that it cannot enter waveguide 14, being polarized at 90° therefrom.

The transmitting energy passed through waveguide 16 is applied to a hybrid junction 17 which may, for example, be of the magic tee form. Specifically, although not necessarily, the input arm 18 is the shunt side arm and the arms 19 and 21 are the collinear arms. Arm 19 is terminated in a non-reflecting power absorber 22 and arm 21 is connected through switches 23 to four antennas 24, 26, 27 and 28. The switches and antennas may have any form which will project four pencil beams, each approximately circular or square in cross section, in the directions depicted in Fig. 1. Additionally, these beams are to be projected in continuous consecutive order as for example, to illuminate the areas on the ground in the order $P_1$, $P_2$, $P_3$, $P_4$, $P_1$, $P_2$, etc. The rate may have any convenient value so that the duration of illumination of an area is much larger than the microwave energy travel time, but not of such duration that the area on the ground is moved through a substantial fraction of its diameter during illumination. For example, an illumination of ½ second may be chosen, so that the period for the entire program of illumination by the four beams is two seconds. This program is operated by a program switch 29 emitting two pulses per second.

The received energy is transmitted through series side arm 31 to a microwave receiver comprising mixer-modulators 32 and 33, local oscillator 34, intermediate frequency amplifiers 36 and 37, automatic frequency control circuit 38, heterodyne second detector 39, and Doppler frequency amplifier 41. This circuit is described in volume 1 of the Radiation Laboratory Series, entitled Radar System Engineering and edited by Louis N. Ridenour, on pages 436 and 632. Briefly described, the received energy is applied to modulator 32 together with a heterodyning signal from oscillator 34, resulting in an intermediate frequency signal, including the Doppler difference, applied to detector 39. A small part of the transmitter energy is heterodyned in modulator 33 to apply intermediate frequency energy but not including any Doppler difference frequency, to detector 39 through conductor 42. The demodulated energy at the Doppler spectrum frequency is applied to amplifier 41.

The alternating current at Doppler difference frequency is applied to a frequency tracker the major portion of which is represented by rectangle 43 but which includes at least one integrating amplifier. Preferably as many integrating amplifiers are employed as there are microwave beams, and the integrating amplifier outputs are in all cases switched in concert with the beam switching. Four such integrating amplifiers are indicated by rectangles 44, 46, 47 and 48, with sequential switching by switches 49 and 51 operated by the program switch 29. Networks 52, 53, 54 and 56 provide means for signal acquisition.

The output signals of the four integrating amplifiers 44, 46, 47 and 48 are tapped by conductors 57, 58, 59 and 61, and the program switching is so arranged that these signals are direct potentials representative of the Doppler frequency differences found in the return signals of beams 1, 2, 3, and 4, respectively. Because of the integrating character of the amplifiers these output signals remain at constant levels during periods of zero amplifier input signal. These direct output potentials may be termed $\nu_1'$, $\nu_2'$, $\nu_3'$, and $\nu_4'$, representative respectively of the frequencies $\nu_1$, $\nu_2$, $\nu_3$, and $\nu_4$. $\nu_1'$ and $\nu_3'$ are subtracted in a subtracting device 62, and since $\nu_3$ has been specified as a negative frequency with the physical meaning described, the algebraic difference of $\nu_1'$ and $\nu_3'$ is the arithmetical sum presented as a direct potential in conductor 63. Similarly the subtracting circuit 64 applies its output direct potential to its output conductor 66, representing the arithmetical sum of frequencies $\nu_2$ and $\nu_4$. These quantities representing values of Equations 24 and 25 thus appear on conductors 63 and 66. These quantities are averaged or added in summing circuit 67 in accordance with Equation 26 to provide a direct potential output in conductor 68 representing the heading velocity magnitude $V_H$. The same quantities are subtracted in subtracting circuit 69 in accordance with Equation 27 to provide a direct potential output on conductor 71 representing the cross velocity magnitude $V_c$.

The outputs of circuits 67 and 69 may be resolved in a direct current circuit to secure the quadrature resultant or, alternatively, they may be converted to alternating currents in converters 72 and 73, then applied to an alternating current right triangle solver 74. The two outputs of resolver 74 are applied to two dials 76 and 77 respectively indicating ground speed $V_g$ and drift angle $\delta$.

Any combination of several forms of microwave beam antennas and of microwave switches may be employed in the circuit of Fig. 3, but a preferred form of microwave switch is that described in Patent No. 2,690,539, issued Sept. 29, 1954, of John F. Zaleski and entitled Microwave Switch. This switch is depicted in Fig. 4 and is briefly described as follows. A cross is formed by hollow rectangular guides, schematically shown as viewed toward their narrow sides, and having four arms 78, 79, 81 and 82. A rod 83 is centrally pivoted at the intersection of the arm axes and is operated by a polarized motor or solenoid 84 so that it assumes either the position shown by solid lines or the position 83' perpendicular thereto shown in dashed lines. In the position shown by the solid lines the arms 78 and 79 are connected for microwave field passage through them and in the other position arms 78 and 82 are connected. The arm 81 is short circuited and has such impedance that the switch presents minimum impedance discontinuity to arm 78 during switching.

Referring again to Fig. 1, a microwave antenna must be employed which will emit four pencil beams 1, 2, 3 and 4 striking the earth at the points $P_1$, $P_2$, $P_3$ and $P_4$, and having the geometry previously described. In addition, these beams must be emitted consecutively and in order. One suitable form of antenna is the planar antenna schematically depicted in Fig. 5, composed of ten parallel linear arrays and numbered from 1 to 10, a minimum of eight arrays being necessary. Arrays and feeds 1 to 8 are all different, arrays 9 and 10 being duplicates of arrays 1 and 2. As many more arrays may be added as are desired, an increase in the number producing increased beam concentration. The planar array is fixed in the aircraft in a horizontal plane at zero pitch and roll angles so that the linear arrays are parallel to the aircraft fore and aft line. They are all fed with microwave energy at their after ends, and are provided with non-reflective terminations at their forward ends. All of the odd-numbered arrays: 1, 3, 5, 7 and 9, are of the in-phase type, and the even-numbered arrays: 2, 4, 6, 8 and 10, are antiphase. Arrays 1, 5 and 9 are fed in parallel, as are arrays 2, 6, 10, arrays 3 and 7, and arrays 4 and 8. That is to say, in a planar array composed of any number of linear arrays, each parallel group consists of every fourth linear array, there being four such parallel groups.

These four groups are fed by four microwave rectangular waveguide systems 86, 87, 88 and 89 which are switched by six microwave switches such as described in connection with Fig. 4, designated 91, 92, 93, 94, 95 and 96. These switches are provided with polarized operating solenoids and are in turn controlled by three direct-current step switches 97, 98 and 99, which apply positive or negative potential to them from the battery 100. The step switches are in turn controlled by the program switch 29, Figs. 3 and 5, previously referred to. The program switch emits pulses at half-second intervals suitable to step the step switches forward so as to complete a cycle of their four contacts every two seconds. The step switches in turn switch the microwave switches so as to energize various combinations of the linear arrays so as to emit single microwave beams 1, 2, 3 and 4 in turn. The program of array switching is given in the table of Fig. 6.

The linear arrays may be of any form which will satisfy the space requirements and which can be made to emit either in-phase or antiphase radiation. An array is termed in-phase when the inherent or coupling phases of its elements are all alike, and an array is termed antiphase when successive elements are opposite in their inherent or coupling phases. One form of linear array which satisfies these requirements is depicted in Fig. 7, in which linear array 101 consists of a series of parallel oblique slots 102 in one of the narrow faces of rectangular guide, forming an in-phase array, and linear array 103 consists of a double series of oblique slots, alternate slots being parallel, in one of the narrow faces of a rectangular guide, forming an antiphase array.

Another form of linear array which satisfies the requirements is depicted in Fig. 8, in which the elemental radiators are shunt slots 106 alternating on opposite sides of the center line of a broad face of a rectangular guide 107, forming an antiphase array. As is well known, when all slots are on the same side of the center line the array is of the in-phase kind. If this form of antenna be used the planar array of Fig. 5 must be broken into two planar arrays, one consisting of all odd-numbered linear arrays in order and the other consisting of all even-numbered linear arrays in order. This segregation is necessary in order that the linear arrays of each component planar array may be placed as close together as required. The wiring diagram of Fig. 5 also applied to this form of antenna, the odd-numbered arrays therein referring to one component planar array and the even-numbered arrays referring to the other component planar array.

In order that the four beams be formed it is necessary that each of the linear arrays be composed of elements having selected spacings and that the linear arrays be spaced from each other laterally by selected amounts. It is also necessary to phase the microwave feed energies by selected amounts, these phase differences being accomplished by additions of lengths of microwave guide which are symbolized by the loops 108, 109, 111, 112, 113, 114, 116 and 117. The relative instantaneous radiation phases of all radiators of all linear arrays are tabulated in Fig. 9. All orthogonal line intersections of this figure represent radiating elements, each horizontal row representing a single linear array. Although the number of radiating elements depicted in a horizontal row is but five, it is understood that any number of radiating elements equal to or greater than five can be used, the phase relations of all progressing as indicated in the table. Similarly, eight or more linear arrays can be used, the phase relations progressing as indicated in the table. In each linear array the radiating elements are equally spaced at the distance $s$, and the linear arrays are equally spaced from each other by the distance $r$, measured from element center to element center. All of the initial radiating elements of the linear arrays lie in a straight line depicted in Fig. 9 by the left vertical line.

The operation of an in-phase linear array of microwave radiators is depicted in Fig. 10, in which the box 115 represents a wave guide feeding linear radiators 118. When this array is fed from the left end a beam 119 may be formed directed downward and to the right. This beam is at the looking angle $\gamma$. The relation of angle $\gamma$ to the parameters is $$\cos \gamma = \frac{\lambda}{\lambda_g} + \frac{n\lambda}{s} \qquad (32)$$

in which $\lambda_g$ is the microwave length in waveguide and $n$ is any integer including zero. It may be shown that when $n=0$ only one beam is emitted, but that when $n$ has any other value, more than one beam is emitted.

It has been found that as a practical matter a value for $$\frac{s}{\lambda_g}$$

of ¼ is necessary. From this it may be shown than any value of $\gamma$ less than 70° 31½' will result in the production of a single lobe or beam of radiation. Since $$\frac{s}{\lambda_g} = \frac{1}{4}$$

the phase difference between two successive elements of a linear array is $$\frac{2\pi s}{g} = \frac{1}{2}\pi = \frac{\pi}{2} \qquad (33)$$

Therefore in all of the odd-numbered linear arrays of Fig. 9 the distance $s$ is equal in radians to $$\frac{\pi}{2}$$

In terms of linear distance from Equation 33, $$s = \frac{\lambda_g}{4} \qquad (34)$$

When two such waveguide linear arrays, 120 and 121, Fig. 11, are placed side by side and parallel at a separation distance $l$, the radiations reinforce each other in a plane normal to the arrays at their centers in two directions, one on either side of the plane between the arrays, the angles to the plane being termed $\beta$ and being equal. The relation between $\beta$ and the parameters is $$\sin \beta = \frac{(\phi + 2\pi n)\lambda}{2\pi \zeta} \qquad (35)$$

in which $\phi$ is the instantaneous phase difference in the energization of the two arrays in the lateral plane. The configuration corresponding to $n=0$ emits a single major lobe on each side. It is preferred to making $\phi = \pi$, in which case, for $n=0$, $$\frac{\zeta}{\lambda} = \frac{1}{2 \sin \beta} \qquad (36)$$

As an example, if $\beta$ be chosen as 30°, $$\frac{\zeta}{\lambda}$$

will have the value of unity, and $\zeta = \lambda$.

Figure 12 illustrates the beam 125 formed by an antiphase array, which may have the direction downward and toward the left when the array is fed from the left end of its waveguide 130. The looking angle $\gamma'$ is $$\cos \gamma' = -\frac{\lambda}{\lambda_g} + \left(n + \frac{1}{2}\right)\frac{\lambda}{s'} \qquad (37)$$

When an antiphase array is combined with an in-phase array, with a common value of $\lambda$ and with $\lambda_g$ identical by design, then in order that the looking directions be symmetrical about the vertical, $$\cos \gamma' = -\cos \gamma \qquad (38)$$

It is obvious that in Equation 24 $n$ should have the value of $-1$ if a single lobe be desired. Combining Equations 19, 24 and 25, $$\frac{s'}{\lambda_g} = \frac{1}{4}, \text{ and } s' = \frac{\lambda_g}{4} \qquad (39)$$

Since this value for $$\frac{s'}{\lambda_g}$$

is thus shown to be necessary, and since as a practical matter the element spacings in the entire linear array should all be the same, it follows that the value of $$\frac{s}{\lambda_g}$$

for the in-phase arrays must also be $$\frac{1}{4}$$

as was previously stated without explanation.

When two antiphase arrays are placed side by side two beams are emitted at angles $\beta$ just as described for two in phase arrays, Equations 35 and 36 being applicable.

It may be shown that in Fig. 11, if a third array 122 similar to arrays 120 and 121 be positioned between them and parallel, and if the middle array be energized with a phase of $$\frac{\pi}{2}$$

relative to a phase of zero for array 120 and of $\pi$ for array 121, that then the middle array will reinforce radiation in the direction 123 but will neutralize radiation in the direction 124. It may also be shown that if the excitation phase of array 122 be changed to $$-\frac{\pi}{2}$$

the lobe 124 will be reinforced while lobe 123 will be neutralized. That is, the introduction of a third array reduces the radiation from two lobes to a single lobe, and control of phase sense controls the selection of the emitted lobe. Since Fig. 11 applies equally to in-phase and antiphase arrays, both kinds of linear arrays may be controlled in this way.

Again referring to Fig. 9, in-phase arrays 1 and 5 are seen to be $\pi$ apart in excitation and radiation phase at each element and therefore to be in the situation depicted in Fig. 11. Additionally, the intermediate in-phase array 3, Fig. 9, fulfills the condition for array 122, Fig. 11. Therefore beam 1 or beam 2 will be formed by these three arrays depending on the phase sense of excitation of array 3. The same remarks apply to the array groups 5, 7, 9; 3, 5, 7; and in combination 1, 3, 5, 7 and 9. Similarly antiphase arrays 2, 4 and 6 will form beam 2 or 4 depending on the excitation phase sense of array 4. The same applies to groups 6 8, 10; 4, 6, 8; and in combination 2, 4, 6, 8 and 10. These statements have been summarized in Fig. 6, the tabulation of microwave switch positions.

The frequency tracker briefly described in connection with Fig. 3 is more fully depicted in Fig. 13. It is preferably of the zero-frequency kind, and comprises a modulator 126 receiving a Doppler-frequency ($f_0$) signal from amplifier 41, Figs. 3 and 13. Modulating energy of, at null, the same frequency $f_0$ is received from an oscillator 127, Fig. 13. The modulated output is passed through a low-pass filter 128, a demodulator 129 and an amplifier 131. Its output is phase-detected in detector 132 which may, for example, comprise a vibrating contact. This detector is phased and driven by a timer 133 which emits a square wave alternating or intermittent direct current at any convenient low freqeuency such as, for example, 25 cps. This timer also frequency-modulates the oscillator 127. The phase detector output is time shared by four integrating amplifiers, the time-sharing being effected by two, 4-step switches 49 and 51. These switches are stepped forward by their solenoids 49' and 51' in accordance with pulses received from the program switch 29 at the rate, for example, of two per second. The stepping of switches 49 and 51 is in synchronism with the beaming of the four microwave beams 1,, 2, 3 and 4 from the four antennas 24, 26, 27 and 28, Fig. 3, respectively, so that when the Doppler frequency $\nu_1$ is received from antenna 24 the integrating amplifier 44, Figs. 3 and 12, is connected into circuit through step switch 49 and 51 contacts number 1. Similarly, the received signals having frequencies $\nu_2$, $\nu_3$ and $\nu_4$ are switched to integrating amplifiers 46, 47 and 48 respectively.

Operation of the zero-frequency tracker is described in patent application Serial No. 371,608 of Newsom et al. filed July 31, 1953 now Patent No. 2,896,074. Briefly, the timer 133 emits a signal having two successive values which cause oscillator 127 to emit two successive frequencies $f_1$ and $f_2$ in alternation, having an average value $f_m$. These oscillator frequencies modulate the input signal having frequency $f_0$, and if $f_m=f_0$, the differences $f_0-f_1$ and $f_2-f_0$ are equal. However, if $f_m$ is higher than $f_0$, the first difference is less than the second and the output during 1/25 second is as illustrated by the waveform 134. If $f_m$ is lower than $f_0$, the first difference is more than the second and the output during the same period is illustrated by 136. The output is passed through low-pass filter 128 having a sloping characteristic resulting in output amplitude inversely proportional to frequency as indicated at 137 and 138. These signals are demodulated at 129, resulting in wave forms 139 and 141 amplified and the direct current components removed in amplifier 131, resulting in wave forms 142 and 143. By synchronous demodulation in detector 132 a direct potential is secured having amplitude and sense representative of the amplitude and sense of the error departure of $f_m$ from $f_0$. This is applied to the integrating amplifier 44, or one of the others, to produce an output potential which rises continuously if the input is negative, falls continuously if the input is positive, and remains at its then potential for an indefinitely long period if the input potential should go to zero. The integrating amplifier output potential is applied to the oscillator 127 input conductor 144 to control and correct the average frequency $f_m$. When $f_m=f_0$ the correcting potential remains constantly at its then attained value. These correcting potentials are also available at conductors 57, 58, 59, and 61 to form the output signals of the frequency tracker.

The integrating amplifiers 44, 46, 47 and 48 are identical, amplifier 44 being shown schematically and the others symbolically. Such an amplifier is fully described in patent application Serial No. 314,306 of John W. Gray et al., filed October 11, 1952, now patent No. 2,856,519 and parts thereof are described in patent No. 2,684,999 of E. A. Goldberg et al., issued July 27, 1954.

Briefly, the input signal from conductor 146 is applied through switch 213' and switch 51, contact 1, to the input grid 147 of a balanced amplifier stage comprising triodes 148 and 149. Output from anode 151 is direct-coupled by resistors 152 and 153 to grid 154 of triode 156. Output is taken from anode terminal 157 to contact 1 of switch 49 and to conductor 57. A large negative feedback capacitor 158 effects the integrating operation. Zero drift is automatically neutralized by triode 159, to which through low-pass filter 161 and chopper armature 162 is applied an alternating potential having a value representative only of the long-term drift of the amplifier zero, the input signal fluctuations being eliminated by filter 161. The drift signal is inverted and amplified by triode 159 and reconverted to direct current by vibrator 163 operated in synchronism with chopper 162 from supply terminal 165. The resulting direct current correction signal is applied to grid 164 of triode 149.

The four integrating amplifier outputs $\gamma_1'$, $\gamma_2'$, $\gamma_3'$ and $\gamma_4'$ impressed on conductors 57, 58, 59 and 61 are direct potentials representative of the frequencies $\gamma_1$, $\gamma_2$, $\gamma_3$ and $\gamma_4$ respectively. Each of these potentials is set during the excitation time of the respective integrating amplifier, and does not vary during the non-excited time because, by means of a high-value grounding resistor such as resistor 166, the integrating amplifier input is kept at zero potential during this time, therefore holding the then-attained output potential constant.

Conductors 57 and 59 apply input signals $\gamma_1'$ and $\gamma_3'$ to an algebraically-adding device 62 comprising resistors 167, 168, 169 and amplifier 171 to perform the operation indicated in Equation 24. Such an adding device is fully described in Volume 21 of the Radiation Laboratory Series, entitled Electronic Instrument, by Greenwood, Holdam and MacRae, on Page 33. Similarly, conductors 58 and 61 apply input signals $\gamma_2'$ and $\gamma_4'$ to device 64 comprising resistors 172, 173, 174 and amplifier 176 to perform the operation of Equation 25. The outputs are algebraically added in device 67 comprising resistors 177, 178, 179 and converter-amplifier 72, the operation being the instrumentation of Equation 26. The converter-amplifier 72 may be of any form such as that comprising a position servomechanism including an electronic amplifier and a motor, the motor driving a potentiometer having an alternating potential output representative of the direct potential input. Alternatively a converter may be employed such as described in patent application Serial No. 490,833, entitled Electrical Signal Power Transfer Circuit, of John W. Gray, filed February 28, 1955, now Patent No. 2,812,482. The outputs of amplifiers 171 and 176 are again added, after inversion of one in an inverter 181, in the device 69 comprising resistors 182, 183, 184 and converter-amplifier 73.

The outputs of converter-amplifiers 72 and 73 are applied to the stator coils 186 and 187 of a resolver employed as a manually-operated arc tangent solver. Such an instrument is fully described in Volume 21 of the Radiation Laboratory Series, supra, on pages 160-162. One rotor coil 188 is connected through an amplifier 189 to a null meter 191. The other rotor coil 192 is connected to a meter 76 indicating $V_g$. The rotor 193 is manually rotated by shaft 194 and a hand crank 196. A dial 77 calibrated in drift angle is also rotated by shaft 194.

It may be shown that, due to the microwave antenna and beam system employed, an error exists in speed ($V_g$) measurement which is proportional to the square of the value of the drift ($\delta$) angle. In order to compensate this error in a simple way the drift shaft 194 is employed as the input to a squaring device 197, which may be a squaring pin cam, the output shaft 198 of which rotates a pinion 199. This pinion 199 engages with a gear sector 201 on the case of the ground speed meter 76 and has the function of rotating the scale therein relative to the indicator hand. The scale thereof being linear, rotation of the drift shaft 194 sets the appropriate drift correction into the speed dial 76.

At the beginning of operation of this microwave navigation system it is more than probable that none of the integrating amplifiers 44, 46, 47, 48, Fig. 13, have output potentials such that any of the frequency tracker oscillator frequencies are at or near the input signal Doppler frequency. The frequency tracker cannot then track the input signal frequency until it "acquires" the signal. That is, until the oscillator is caused momentarily approximately to match the input signal in frequency. This is accomplished by providing, as an adjunct to each of the integrating amplifiers 44, 46, 47, and 48, an acquisition circuit 52, 53, 54 and 56, respectively.

Acquisition circuit 52 is depicted schematically, and consists of positive and negative voltage sources and a manually operated switch. Resistors 202 and 203 are connected between ground and a positive terminal 204. Resistors 206 and 207 are connected between ground and a negative terminal 208. The common terminals 209 and 211 of the resistors are connected to the fixed contacts of a switch and the movable contact arm 212 is connected to grid 147 of triode 148. These resistors are sufficiently high in resistance so that the voltage applied through them will be overridden by the normal frequency tracker voltage signal. In the absence of a frequency tracker signal, movement of the switch 212 to one side progressively and continuously increases the frequency of oscillator 127, during the dwell of switches 49 and 51 on contact 1, and movement of switch 212 to the other side decreases the frequency of oscillator 127. In order to keep the output of the integrating amplifier 44 continuously connected to oscillator 127 during acquisition a switch 213—213' in the integrator input and output conductors is provided to switch the input and output through a manual four-position switch 214—214' to any one of the four integrating amplifiers.

In the operation of the microwave navigation system the manual switch 213—213' is positioned on contact 216 and 217 and manual switch 214—214' is positioned in its number one position. The momentary contact manual acquisition switch 212 for integrator 44 is then moved to one contact, say contact 218, applying positive potential to the integrator input and causing its output potential to sweep down. If, when the switch 212 is moved to contact 218 the signal is not acquired, the switch is moved to its other contact 219, causing the output potential to sweep up. This output potential applied to oscillator 127 causes its frequency to change. If its average frequency becomes nearly equal to the Doppler frequency $f_0$ a signal appears at the output of phase detector 132 and is superimposed on the acquisition signal at grid 147. The frequency tracker signal overrides the acquisition circuit signal and thus secures control of the oscillator 127. The occurrence of signal acquisition is indicated by the meters 191 and 76, which continuously change their indications while the acquisition circuit is in control, but which remain stationary when the frequency tracker acquires the Doppler signal. The switch 214 is now moved to position two and the process is repeated using acquisition circuit 53. The switch is then moved to the other two positions, and on the completion of the four acquisition operations all four integrating amplifiers will, in coordination with the remainder of the frequency tracker loop, have acquired the Doppler signal. The switch 213—213' is now moved to its other position, permitting the four integrators to operate in time-shared sequence.

I claim:

1. An aircraft self-contained speed and drift measuring system comprising, a transmitter, antenna means rigidly secured to said aircraft in a fixed position relative thereto, first switch, means interconnecting said antenna means and said transmitter for causing said antenna means to radiate singly and in time sequence a plurality of signal beams directed toward the earth's surface at spaced areas located forwardly, rearwardly and on opposite sides of the intersection of the aircraft vertical and the earth, means for receiving individual echo signals reflected from the earth's surface by the illumination thereof of each of said beams each echo signal having a frequency which departs from that of the transmitted signal frequency by an amount and in a sense dependent on the velocity of the aircraft relative to a respective illuminated area of the earth's surface, means including second switch means operated in synchronism with said first switch means for producing from each of said echo signals an electrical signal having a characteristic which varies in accordance with the departure in frequency of each echo signal from the transmitted signal, means operated by the conjoint application of said electrical signals for producing therefrom a pair of output signals representing aircraft speed and drift, and indicating means actuated by said pair of output signals.

2. An aircraft self-contained speed and drift measuring system comprising, antenna means rigidly secured to said aircraft in a fixed position relative thereto, a microwave signal generator, first switch means interconnecting said signal generator and said antenna means for causing said antenna means to emit singly and in successive time sequence a plurality of signal beams directed toward the earth's surface at spaced areas located forwardly, rearwardly and on opposite sides of the intersection of the aircraft vertical and the earth's surface, means for receiving individual echo signals reflected from said spaced areas of the earth's surface, said echo signals having frequencies which are Doppler shifted from the frequency of the transmitted signals by amounts and in senses dependent on the velocity of the aircraft relative to a respective area, means for demodulating each of said echo signals to produce Doppler signals the frequencies of which are representative of the Doppler shift thereof, means including second switch means operated in synchronism with said first switch means for individually converting each of said Doppler signals into electrical signals having characteristics which vary in accordance with the frequencies of said Doppler signals, means having said electrical signals impressed thereon and deriving therefrom a pair of output signals representing aircraft speed and drift, and indicating means actuated by said pair of output signals.

3. An aircraft self-contained speed and drift measuring system comprising, antenna means rigidly secured to said aircraft in a fixed position relative thereto, a microwave signal generator, first switch means interconnecting said signal generator and said antenna means for causing said antenna means to emit singly and in successive time sequence a plurality of signal beams directed towards the earth's surface at spaced areas located forwardly, rearwardly and on opposite sides of the intersection of the aircraft vertical and the earth's surface, means for receiving individual echo signals reflected from said spaced areas of the earth's surface, the frequency of each echo signal being Doppler shifted from the frequency of the emitted signal beams by amounts and in senses dependent on the velocity of the aircraft relative to a respective area, means for demodulating each of said echo signals to produce Doppler signals having frequencies equal to the Doppler shift of a respective echo signal, means including second switch means operated in synchronism with said first switch means for individually converting each of said Doppler signals into potentials the magnitudes of which are proportional to the frequencies of said Doppler signals, computer means having said potentials impressed thereon and producing therefrom a signal representing aircraft speed and a signal representing aircraft drift angle, and indicators actuated by said last mentioned signals.

4. An aircraft self-contained speed and drift measuring system comprising, a microwave transmitter, antenna means rigidly secured to said aircraft, program timer switching means connected to said antenna means for causing said antenna means to emit singly and in successive time sequence a series of four signal beams directed towards the earth's surface at spaced areas located respectively forward-right, forward-left, rear-right and rear-left as respects the intersection of the aircraft vertical and the earth's surface, receiving means for receiving the echo signals reflected from said spaced areas, said receiving means including demodulating means for demodulating said echo signals and producing therefrom four separate and distinct Doppler-frequency signals, frequency tracker means tracking each of said Doppler-frequency signals, said frequency tracker including means switched by said program timer means in synchronism with the switching of said antenna means for converting each of said Doppler-frequency signals into respective direct potentials, the magnitudes of which are representative of the frequency of respective ones of said Doppler-frequency signals, computer means having said direct potentials impressed thereon and deriving therefrom a pair of signals one of which is representative of aircraft speed and the other of which is representative of aircraft drift angle, and indicating means actuated by said pair of signals.

5. An aircraft speed and drift measuring system in accordance with claim 4 in which the means for converting the Doppler-frequency signals into direct potentials comprises four separate integrating amplifiers.

6. An aircraft speed and drift measuring system in accordance with claim 4 in which said computer means includes a first subtracting circuit producing a first difference signal from that two of said direct potentials which are representative of the frequencies of the echo signals reflected from the forward-left and rear-right areas, a second subtracting circuit producing a second difference signal from the remaining two of said direct potentials, a third subtracting circuit having said first and second difference signals impressed thereon and producing a third difference signal therefrom, a summing circuit having said first and second difference signals impressed thereon and producing a sum signal therefrom, right triangle solver means having said third difference and sum signals impressed thereon and producing therefrom a pair of signals one of which is representative of the vector sum and the other of which is representative of the vector angle of said sum and third difference signals.

7. An aircraft speed and drift measuring system in accordance with claim 4 in which said computer means includes a first subtracting circuit producing a first difference signal from that two of said direct potentials which are representative of the frequencies of the echo signals reflected from the forward-left and rear-right areas, a second subtracting circuit producing a second difference signal from the remaining two of said direct potentials, a third subtracting circuit having said first and second difference signals impressed thereon and producing a third difference signal therefrom, a summing circuit having said first and second difference signals thereon and producing a sum signal therefrom, converter means converting said sum signal and said third difference signal into a pair of equivalent alternating current signals, an arc tangent solver of the induction resolver type having said pair of alternating current signals impressed thereon, a drift indicator positioned in accordance with the mechanical angular position of said arc tangent solver and a ground speed indicator actuated by the alternating current output signal of said arc tangent solver.

No references cited.